(12) United States Patent
Crooks et al.

(10) Patent No.: US 11,028,020 B2
(45) Date of Patent: Jun. 8, 2021

(54) CERAMIC COMPOSITION AND METHOD OF MAKING THE COMPOSITION

(71) Applicant: The Boeing Company, Chicago, IL (US)

(72) Inventors: Tab Hunter Crooks, Dana Point, CA (US); MaryAnn S. Muench, La Mirada, CA (US)

(73) Assignee: THE BOEING COMPANY, Chicago, IL (US)

( * ) Notice: Subject to any disclaimer, the term of this patent is extended or adjusted under 35 U.S.C. 154(b) by 342 days.

(21) Appl. No.: 16/143,319

(22) Filed: Sep. 26, 2018

(65) Prior Publication Data
US 2020/0095172 A1    Mar. 26, 2020

(51) Int. Cl.
*C04B 37/00* (2006.01)

(52) U.S. Cl.
CPC .................................. *C04B 37/003* (2013.01)

(58) Field of Classification Search
CPC ............ C04B 35/6269; C04B 35/6365; C04B 37/003; C04B 37/005; C04B 37/008; C04B 37/025; C04B 41/0072; C04B 41/009; C04B 41/80; C08K 3/38; B32B 5/32; B32B 7/02; B32B 7/12; B32B 18/00

See application file for complete search history.

(56) References Cited

U.S. PATENT DOCUMENTS

| | | | | |
|---|---|---|---|---|
| 3,855,393 A | * | 12/1974 | Rao | F16L 59/04 423/339 |
| 4,010,048 A | * | 3/1977 | Tesk | A61K 6/844 148/24 |
| 4,595,662 A | * | 6/1986 | Mochida | F28F 21/04 501/15 |
| 4,624,897 A | * | 11/1986 | Ito | B23K 35/001 428/432 |
| 4,770,707 A | | 9/1988 | Smith | |

(Continued)

FOREIGN PATENT DOCUMENTS

| CN | 107460545 A | 12/2017 |
|---|---|---|
| EP | 3040322 A2 | 7/2016 |
| GB | 1481761 | 8/1977 |

OTHER PUBLICATIONS

Extended European Search Report dated Feb. 21, 2020 in corresponding European Application No. 1919692.5, 9 pages.

(Continued)

*Primary Examiner* — David J Bolduc
(74) *Attorney, Agent, or Firm* — MH2 Technology Law Group LLP (57) ABSTRACT

A method of making a ceramic composite comprises forming a wet ceramic composition comprising a plurality of discrete ceramic components and a fluxing agent dissolved in a solvent. At least a portion of the solvent is removed from the wet ceramic composition to form a dried ceramic composition comprising the plurality of discrete ceramic components coated with the fluxing agent. The dried ceramic composition is sintered to form the ceramic composite, the sintering being carried out at a sinter temperature sufficient to fuse the discrete ceramic components at bridging sites formed where two or more of the discrete ceramic components coated with fluxing agent are in physical contact.

27 Claims, 4 Drawing Sheets

(56) References Cited

U.S. PATENT DOCUMENTS

| | | | |
|---|---|---|---|
| 5,804,306 A * | 9/1998 | Sorenson | B32B 18/00 |
| | | | 425/426 |
| 6,770,584 B2 | 8/2004 | Barney et al. | |
| 6,897,123 B2 * | 5/2005 | Winther | H01L 21/2007 |
| | | | 257/E21.122 |
| 2011/0003077 A1 * | 1/2011 | Heng | C04B 41/009 |
| | | | 427/294 |
| 2014/0086670 A1 * | 3/2014 | Ohkuni | C04B 37/006 |
| | | | 403/272 |
| 2015/0034604 A1 * | 2/2015 | Subramanian | B28B 1/008 |
| | | | 219/73.21 |
| 2016/0185935 A1 * | 6/2016 | Crooks | C04B 35/6365 |
| | | | 428/212 |
| 2016/0264478 A1 * | 9/2016 | Crooks | C04B 37/04 |

OTHER PUBLICATIONS

Wikipedia, "Polyoxymethylene," https://en.wikipedia.org/wiki/polyoxymethylene, pp. 1-7.

* cited by examiner

CERAMIC COMPOSITION AND METHOD OF MAKING THE COMPOSITION

DETAILED DESCRIPTION

Field of the Disclosure

The present disclosure is directed to a method of making a ceramic composite and the ceramic composite made therefrom.

BACKGROUND

Ceramic composites, such as ceramic oxide composites, are well known for use in a variety of applications, including insulating and thermal protection systems for aerospace vehicles. For example, composites made from ceramic oxide fibers, such as alumina, and/or silica fiber-based ceramics, are well known for use in light weight insulating tiles that can be employed as a heat shield for space flight vehicles, as well as in other applications where rapid heat dissipation, thermal insulation and the ability to maintain structural integrity at very high temperatures are useful.

Ceramic oxide fibers are known to be bonded together using a solid particulate boron source. The solid particulate boron source allows the high melting point ceramic fibers to fuse and bond together in the vicinity of the solid particulates. The solid particulate boron source remains in solid form throughout the process of making the ceramic composite up to the sintering stage, where it decomposes and reacts with the oxide fibers within its vicinity.

Lithium metaborate is a fluxing agent known for lowering the melting point of ceramic compositions, such as ceramic oxides, which can allow the ceramic to digest into liquid solution for chemical analysis. Fluxing agents, such as lithium metaborate and others used for such chemical analysis processes, are generally used to completely melt or otherwise destroy the mechanical structure of the ceramic oxide.

Ceramic materials in general can be brittle and lack strength. Novel materials and techniques for increasing strength of ceramic materials would be considered a valuable step forward in the art.

SUMMARY

The present disclosure is directed to a method of making a ceramic composite. The method comprises forming a wet ceramic composition comprising a plurality of discrete ceramic components and a fluxing agent dissolved in a solvent. At least a portion of the solvent is removed from the wet ceramic composition to form a dried ceramic composition comprising the plurality of discrete ceramic components coated with the fluxing agent. The dried ceramic composition is sintered to form the ceramic composite, the sintering being carried out at a sinter temperature sufficient to fuse the discrete ceramic components at bridging sites formed where two or more of the discrete ceramic components coated with fluxing agent are in physical contact.

The present disclosure is also directed to a ceramic composite. The ceramic composite comprises a plurality of discrete ceramic components comprising (i) one or more ceramic compounds and (ii) one or more soluble fluxing agent atoms incorporated into a surface of the ceramic components, the ceramic components being fused together at bridging sites located where two or more of the discrete ceramic components are in physical contact.

The present disclosure is also directed to a method of strengthening a ceramic composite. The method comprises forming a wet ceramic composition comprising a plurality of discrete ceramic components and a fluxing agent dissolved in a solvent. At least a portion of the solvent is removed from the wet ceramic composition to form a dried ceramic composition comprising the plurality of discrete ceramic components coated with the fluxing agent. The dried ceramic composition is sintered to form the ceramic composite, the sintering being carried out at a sinter temperature sufficient to fuse the discrete ceramic components at bridging sites formed where two or more of the discrete ceramic components coated with fluxing agent are in physical contact. The ceramic composite has a first tensile strength that is greater than a second tensile strength of a second ceramic composite, where the second ceramic composite is made using a similar process with the same ingredients in the same amounts by weight as the ceramic composite having the first tensile strength, except that the only fluxing agent of the second ceramic composite is non-soluble and remains in a solid form until sintering while making the second ceramic composite.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The inventors of the present disclosure have found that non-soluble solid particulate boron sources, traditionally used for fusing ceramics, do not initiate sufficient node sites to bond networks of ceramic fibers or other ceramic particulates, resulting in ceramic composites with low tensile strength. The present disclosure employs a soluble fluxing agent to increase bonding sites in the microstructure of the resulting ceramic composites after sintering. This novel technique has been shown to provide composites with improved tensile strength compared to composites made using processes that employ only non-soluble, solid fluxing agents, while maintaining thermal performance properties of the composites.

The present disclosure is directed to a method of making a ceramic composite. As shown at process 2 of FIG. 1, the method comprises forming a wet ceramic composition comprising a plurality of discrete ceramic components and a soluble fluxing agent dissolved in a solvent. As described herein, the soluble fluxing agent can be used with or without a non-soluble fluxing agent. The term "discrete ceramic components" refers to, for example, ceramic fibers or other ceramic particles, as described herein below. Referring to process 4, at least a portion of the solvent is removed from the wet ceramic composition to form a dried ceramic composition. The dried ceramic composition comprises the plurality of discrete ceramic components coated with the fluxing agent. As shown at process 6, the dried ceramic composition is sintered at a sinter temperature sufficient to fuse the discrete ceramic components to form bridging sites, where two or more of the discrete ceramic components coated with fluxing agent are in physical contact, without causing excessive melting that can compromise the tensile strength.

The soluble fluxing agent has the ability to lower the melting temperature of the ceramic material at the surface of the ceramic components when incorporated therein. Further, the soluble fluxing agent may soften or partially dissolve the material at the surface of the ceramic components. The soluble fluxing agent is soluble in a solvent, such as, for example, any aqueous or non-aqueous solvent that is compatible with the method of FIG. 1. Aqueous and non-aqueous solvents are described in more detail below. The particular soluble fluxing agent employed will depend on, among other things, the material used for the discrete ceramic components. As examples, suitable fluxing agents can be chosen from borates, carbonates, phosphates, silicates, and combinations thereof. Specific examples include borates such as lithium metaborate, lithium tetraborate and other alkali metal borates or alkaline earth metal borates; carbonates such as alkali metal carbonates (e.g., sodium carbonate, potassium carbonate and other alkali metal carbonates) and alkaline earth metal carbonates; phosphates such as alkali metal phosphates or alkaline earth metal phosphates; and silicates such as alkali metal silicates and alkaline earth metal silicates, and combinations of any of the above borates, carbonates, phosphates and silicates.

Figure 4:
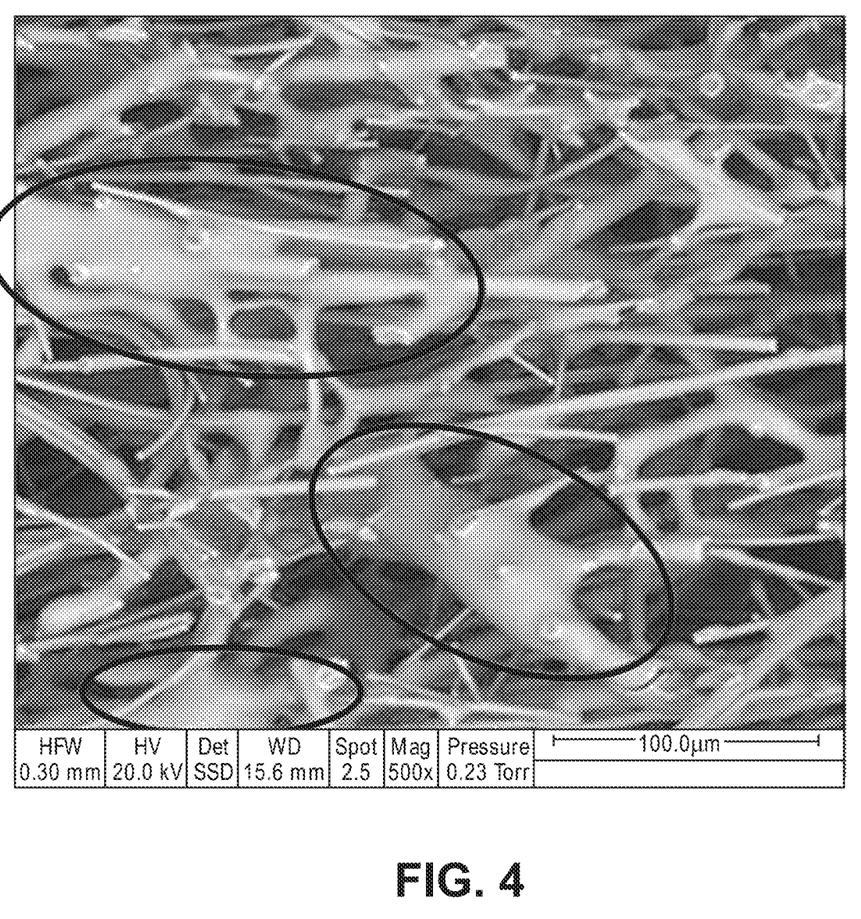
FIG. 4 illustrates a SEM Micrograph of a sintered ceramic composite with regions of excessive melting, according to an example of the present disclosure.

By controlling the concentration of the soluble fluxing agent, the total amount of fluxing agent coated on the discrete ceramic components can be tailored to sufficiently lower the melting temperature of the surfaces of the discrete ceramic components. The amount of fluxing agent used is sufficient to lower the melting temperature of the surfaces of the discrete ceramic components, without destroying the structure of the discrete ceramic components. Too much of either or both of a soluble or non-soluble fluxing agent can lead to nodes or nodules at the fiber junctions at which excessive melting occurs. Excessive melting at the fiber junctions does not enhance the tensile strength of the composite and may have undesirable effects, such as embrittlement or mechanical or thermal performance degradation. An example of such a sintered composite is shown in FIG. 4, in which the regions with excessive melting have been circled. The composite of FIG. 4 was made using two flux agents (lithium metaborate and boron carbide). The undesirable excessive melting can result from too much fluxing agent (either soluble or non-soluble) or from employing very high sintering temperatures or a combination of both. Using too little soluble fluxing agent will result in insufficient fusing of the discrete ceramic components, and thus will not provide the desired increase in tensile strength. In an example, the amount of soluble fluxing agent (e.g., lithium metaborate or any of the other soluble fluxing agents herein) ranges from about 0.5 to about 2 weight percent, based on the total weight of discrete ceramic components in the wet composition, such as about 0.6 to about 1.2 weight percent, or about 0.9 to about 1.0 weight percent. In an example, the amount of non-soluble fluxing agent (e.g., boron carbide or any of the other non-soluble fluxing agents herein) can range from about 0.3 to 2 weight percent, based on the total weight of discrete ceramic components in the wet composition. About 0.01% to about 0.5% by weight is an estimated amount of total fluxing agent in the final product after forming and drying the ceramic, although if all of the fluxing agent is used up in reaction there may only be trace amounts, or none, left in the final product. Amounts of fluxing agents outside of the above ranges may be employed.

Figure 1:
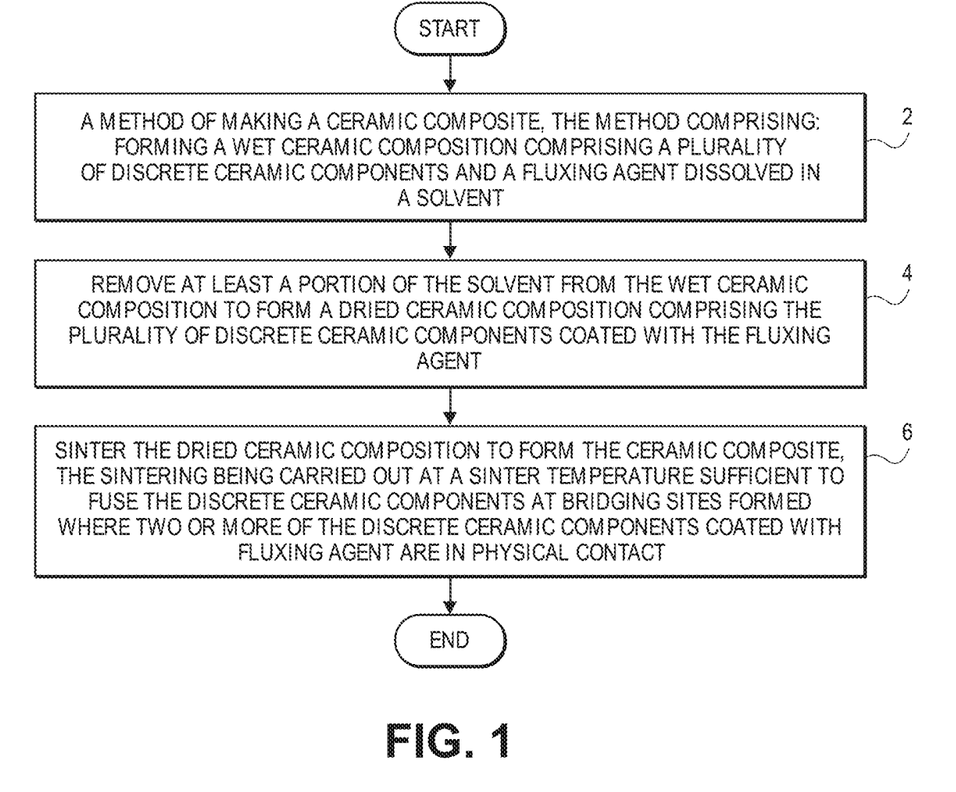
FIG. 1 shows a flowchart of a method of making a ceramic composite, according to an aspect of the present disclosure.

The soluble fluxing agent can be dissolved in a solvent prior to or during the method of FIG. 1. In an example, the soluble fluxing agent is added directly to the slurry in a powder form and is partially or completely dissolved in the slurry solvent. In an example, 80% to 100% by weight of the soluble fluxing agent may be dissolved in the solvent, such as 90% to 100% by weight, or 95% to 100% by weight. The solvent employed in the method of FIG. 1 has the ability to dissolve the fluxing agent without dissolving the discrete ceramic components. The solvent can be an aqueous solvent, non-aqueous solvent, or combinations thereof. Examples of aqueous solvents include water or any solvent that is primarily composed of water. Examples of non-aqueous solvents include polar solvents, such as alcohols.

The plurality of discrete ceramic components from which the ceramic oxide is made can be in the form of particles or fibers, or in any other suitable form. Examples of suitable particles include spherical granules or non-spherical granules, such as flakes, tubes, whiskers, or other particles. Any suitable ceramic fibers can be employed. If the ceramic components are in the form of fibers, the fibers can have an aspect ratio of about as small as 1:10 or as large as 10,000 or more, such as 2 to 10,000, or about 5 to about 1000. The fibers can include solid fibers, tubular fibers, such as nanotubes, or mixtures thereof. Combinations of any of the particles and fibers listed herein can be employed.

The plurality of discrete ceramic components can comprise any suitable ceramic material. Examples of suitable materials include ceramic oxides, such as a material selected from titania, silica, alumina, zirconia, and combinations thereof. An example of a combination of these oxides is silica alum inate, including zeolites. Other types of ceramics, such as clays and non-oxide ceramics can also be employed.

During the method of FIG. 1, the solubilized fluxing agent coats the discrete ceramic components upon removal of the solvent during the drying process. The drying process can be accomplished by any suitable technique, such as by air drying, heating, and/or reducing pressure to vaporize the solvent. The drying process may be carried out separately from, or simultaneous with, the heating process employed for the sintering process in the method of FIG. 1.

Figure 2:
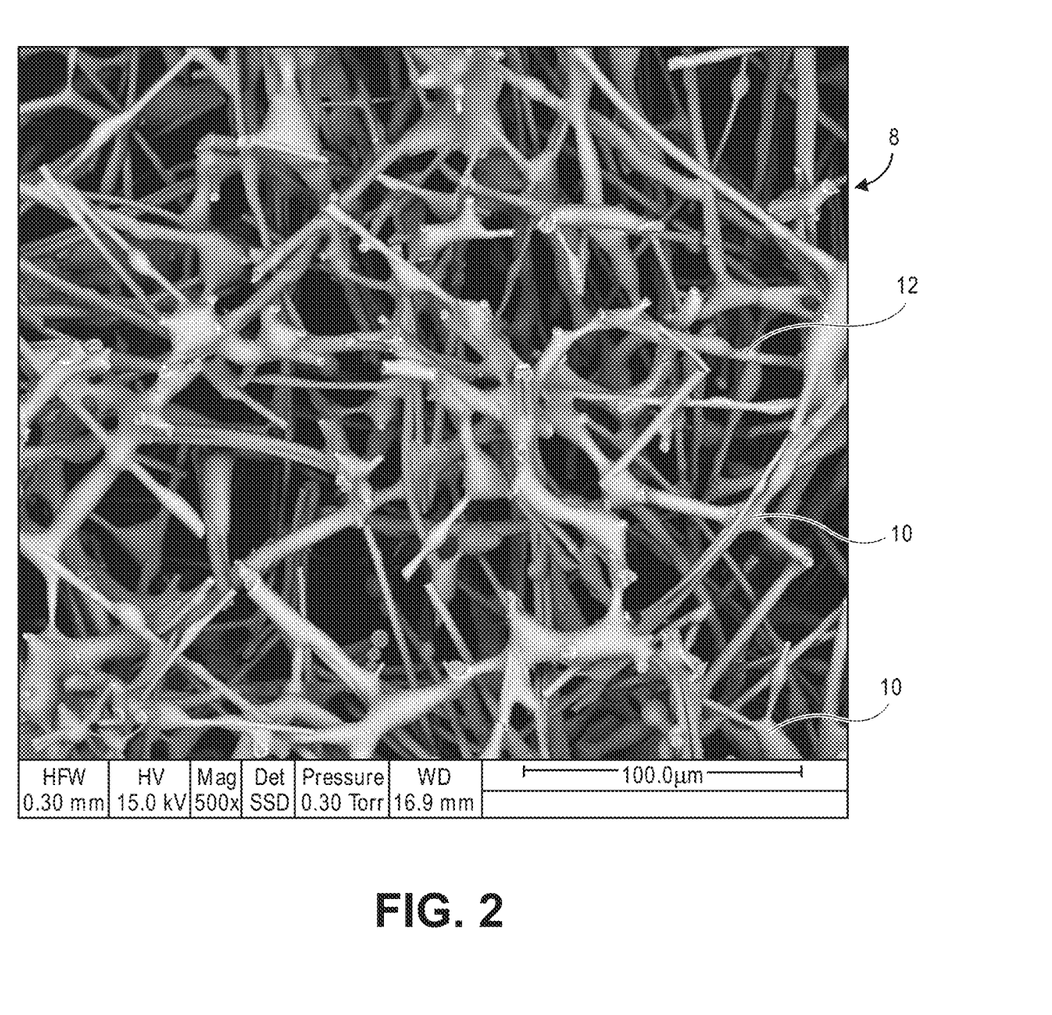
FIG. 2 illustrates a SEM Micrograph of a sintered ceramic composite, according to an example of the present disclosure.

Contacting the discrete ceramic components with the fluxing agent during the processes of 2 and 4 of FIG. 1 reduces the melting temperature of at least a surface portion of the discrete ceramic components compared to the melting temperature of untreated discrete ceramic components. During the subsequent sintering, the lower melting temperature ceramic surface portions of the discrete ceramic components can melt, or "sinter" together to form bridging sites that bond the ceramic components at locations where two or more of the discrete ceramic components physically contact one another, thereby encouraging the formation of sufficient bridging sites to bond the network of ceramic fibers or other discrete ceramic components and enhance the tensile strength of the sintered composite material. An example of a sintered ceramic composite 8 comprising bridging sites 10 bonding together discrete ceramic components 12 is illustrated in FIG. 2.

The sinter temperatures and times employed in the method of FIG. 1 will depend on the materials used for the discrete ceramic components and the type of fluxing agent employed. Sintering temperatures and times can be chosen to provide the desired degree of melting, or fusing, at the points where the discrete ceramic components contact each other. Over-sintering can result in problems, such as composites that are too rigid, or brittle. Examples of a suitable sinter temperature ranges from about 2000° F. to about 2700° F., such as about 2200° F. to about 2600° F., or about 2300° F. to about 2500° F. The peak firing temperatures can be maintained for a suitable time period that will provide the desired amount of fusing of the ceramic components, such as, for example, about 1 hour to about 5 hours, or about 2 hours to about 3 hours.

Optional ingredients can be added during process 2 of the method of FIG. 1 in addition to soluble fluxing agent, solvent and the discrete ceramic components already described. Examples of optional ingredients include colorants or emittance agents for modifying the optical properties of the ceramic composite, surfactants and granular fluxing agents. Any other desired optional ingredients could also be employed.

In an example, the methods of the present disclosure do not employ a non-soluble fluxing agent (e.g., a granular fluxing agent that does not appreciably dissolve in the solvent at process temperatures so that 80% to 100% by weight of the non-soluble fluxing agent remains in solid form prior to sintering) to form the ceramic compositions. In an alternative example, the compositions include non-soluble fluxing agents, in addition to the soluble fluxing agents. The non-soluble fluxing agents can be, for example, a granular fluxing agent that does not appreciably dissolve in the solvent so that 80% to 100% by weight of the non-soluble fluxing agent remains in solid form prior to sintering. Examples of suitable non-soluble fluxing agents can include boron carbide ($B_4C$), boron nitride powder, and alum inoborosilicate fiber, among others. In an example, both one or more of the disclosed soluble fluxing agents and one or more of the disclosed non-soluble fluxing agents are employed. The "bridging sites" described herein can be formed using a soluble fluxing agent, with or without the use of a non-soluble (e.g., granular) fluxing agent.

The present disclosure is also directed to a ceramic composite. The ceramic composite comprises a plurality of discrete ceramic components. The discrete ceramic components include (i) one or more ceramic compounds and (ii) one or more soluble fluxing agent atoms. The soluble fluxing agent atoms are incorporated into a surface of the ceramic components, thereby effectively lowering the melting temperature of the surface of the discrete ceramic components. The term "incorporated" as used in the phrase "soluble fluxing agent atoms are incorporated into a surface of the ceramic components," means that atoms from the soluble fluxing agent coat, are infused into or otherwise mix with or are bound to the surface of the discrete ceramic composites. For example, the fluxing agent atoms can be incorporated into 40% to 100% of the total surface of the discrete ceramic components, such as 50% to 100%, or 70% to 100%, or 90% to 100% of the total surface. Because the fluxing agent is incorporated into the surface of the discrete ceramic components, the discrete ceramic components are able to be fused together to form bridging sites at points where two or more of the discrete ceramic components are in physical contact. For example, the bridging sites can be formed at 30% to 100% of the contact points where two or more of the discrete ceramic components are in physical contact.

The fluxing agent atoms incorporated into the discrete ceramic components can be any atom or combination of atoms that are derived from the fluxing agent compound. For example, if the fluxing agent is lithium metaborate, the atoms incorporated into the discrete ceramic components can include lithium atoms, as well as boron atoms, and/or oxygen atoms. The atoms can be bonded in any manner, such as ionically or covalently bonded, to the materials that make up the discrete ceramic components so as to form a modified ceramic compound with a reduced melting point compared to the melting point of the discrete ceramic components prior to incorporation of the fluxing agent.

Figure 3:
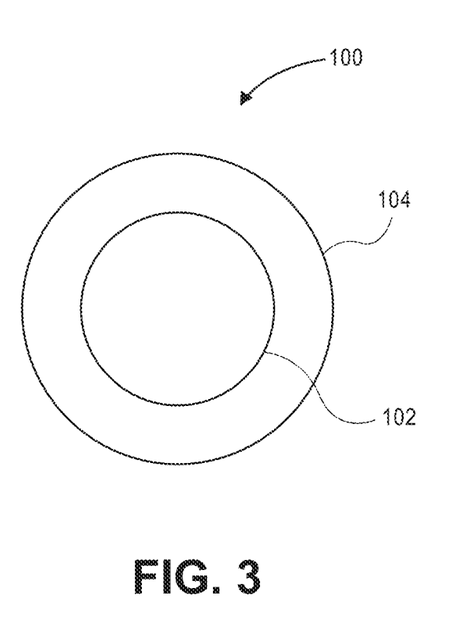
FIG. 3 shows a cross-section of a fiber that has been modified to include fluxing agent, according to an example of the present disclosure.

Any of the plurality of discrete ceramic component materials described herein can be employed. Where, for example, the discrete ceramic component comprises a ceramic oxide selected from titania, silica, alumina, zirconia, or a combination thereof, then the modified ceramic after introduction of the fluxing agent and sintering may be a titania, silica, alumina, and/or zirconia ceramic that includes lithium incorporated therein. FIG. 3 shows one example of a fiber that has been modified to include the fluxing agent. The fiber 100 comprises an inner core 102 of the ceramic oxide from which the fiber was made prior to introduction of the fluxing agent (e.g., titania, silica, alumina, and/or zirconia ceramic). A coating 104 surrounds the inner core. Coating 104 comprises the modified fiber material that incorporates the fluxing agent atoms mixed with the original ceramic fiber material, as described above. An example of the modified material of coating 104 is lithium alumina silicate, where lithium metaborate is used as the fluxing agent and the discrete ceramic components are alumina silicate fibers. The modified discrete ceramic components are not limited to fibers, but can be in any desired form, such as particles, as described herein. The discrete ceramic components are bound together at one or more bridging sites, as shown and described above with respect to FIG. 2. In an example, the sintered ceramic composition does include at least one nodule formed from a non-soluble fluxing agent, as described herein above.

The resulting composites can comprise any of the optional ingredients described herein, or any resulting compounds that are the products of any reactions between these and other ingredients during the making of the composites. Example optional ingredients, including colorants, emittance agents, surfactants and non-soluble fluxing agents can be employed in any effective amounts, as could be determined by one of ordinary skill in the art.

The composites of the present disclosure exhibit an increased tensile strength compared to composites made solely with granular fluxing agent. For example, the tensile strength of the ceramic composite can be increased, such as by a range of 10% to 40% or more, compared to the tensile strength of a second ceramic composite that is made using granular fluxing agents that are not dissolved in a solvent prior to sintering. The tensile strength, as described herein, is measured by the ASTM D-1623-type B testing procedure (a tensile pull test) using a test specimen in the through-the-thickness ("TTT") or in-plane (IP) orientation. In an example, the number of bridging sites per unit volume of the ceramic composites of the present disclosure is greater than for a second ceramic composite, where the second ceramic composite is made using a similar process with the same ingredients in the same amounts by weight as the first ceramic composite, except that the only fluxing agent employed in the second ceramic composite is a non-soluble fluxing agent.

EXAMPLES

Test specimens were machined from selected regions as representative of the entire fired and trimmed ceramic foam. Specimens were made with orientations along the through-the-thickness (TTT) and the in-plane (IP) direction of the ceramic foam. A band saw was used to perform the initial rough cuts. A radial-arm saw and/or disc sander with a diamond coated blade tip was used for all final machining to minimize initiating surface flaws. Each test specimen was bonded to tensile loading blocks using an epoxy adhesive. Once the adhesive had cured overnight under ambient condition, each specimen was loaded to the Instron machine with movable crosshead type, conforming to the requirements of ASTM E-4. Room temperature tensile pull test was conducted per ASTM D 1623, Type B.

TABLE 1

|  | Average TTT Strength (psi) | Average IP Strength (psi) |
|---|---|---|
| Comparative Example: Ceramic foam made with Boron carbide flux agent alone. | 67.9 | 266.9 |
| Example 1: Ceramic foam made with both lithium metaborate and boron carbide flux agents | 87.4 | 366.4 |

The % strength improvement of the Example 1 ceramic relative to the baseline was about a 29% increase for specimens with a through-the-thickness (TTT) orientation and a 37% increase for specimens with an in-plane (IP) orientation.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations, and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A method of making a ceramic composite, the method comprising:
   forming a wet ceramic composition comprising a plurality of discrete ceramic components and a fluxing agent dissolved in a solvent;
   removing at least a portion of the solvent from the wet ceramic composition to form a dried ceramic composition comprising the plurality of discrete ceramic components coated with the fluxing agent; and
   sintering the dried ceramic composition to form the ceramic composite, the sintering being carried out at a sinter temperature sufficient to fuse the discrete ceramic components at bridging sites formed where two or more of the discrete ceramic components coated with fluxing agent are in physical contact,
   wherein the number of bridging sites per unit volume of the ceramic composite is greater than for a ceramic second composite, if the ceramic second composite were to be made using a similar process with the same ingredients in the same amounts by weight as the ceramic composite, except that the only fluxing agent employed in the ceramic second composite was a non-soluble fluxing agent.

2. The method of claim 1, wherein the fluxing agent is chosen from lithium metaborate, carbonates, borates, phosphates, silicates, and combinations thereof.

3. The method of claim 1, wherein the fluxing agent is lithium metaborate.

4. The method of claim 1, wherein the amount of soluble fluxing agent in the wet ceramic composition ranges from about 0.5 to about 2 weight percent based on the total weight of discrete ceramic components.

5. The method of claim 1, wherein the solvent comprises a compound chosen from water, a non-aqueous solvent, and mixtures thereof.

6. The method of claim 1, wherein the plurality of discrete ceramic components comprise a ceramic oxide.

7. The method of claim 6, wherein the ceramic oxide comprises a material selected from titania, silica, alumina, zirconia, and combinations thereof.

8. The method of claim 1, wherein the plurality of discrete ceramic components are in a form of particles or fibers.

9. The method of claim 1, wherein the sinter temperature ranges from about 2200° F. to about 2700° F.

10. The method of claim 1, wherein the wet ceramic composition does not include a non-soluble fluxing agent.

11. The method of claim 1, wherein the wet ceramic composition further comprises at least one non-soluble fluxing agent.

12. The method of claim 11, wherein the amount of non-soluble fluxing agent in the wet ceramic composition ranges from about 0.3 to about 2 weight percent based on the total weight of discrete ceramic components.

13. A ceramic composite, comprising:
a plurality of discrete ceramic components comprising (i) one or more ceramic compounds and (ii) one or more soluble fluxing agent atoms incorporated into at least a surface of the discrete ceramic components, the discrete ceramic components being fused together at bridging sites located where two or more of the discrete ceramic components are in physical contact,
wherein the number of bridging sites per unit volume of the ceramic composite is greater than for a ceramic second composite, if the ceramic second composite were to be made using a similar process with the same ingredients in the same amounts by weight as the ceramic composite, except that the only fluxing agent employed in the ceramic second composite was a non-soluble fluxing agent.

14. The ceramic composite of claim 13, wherein the fluxing agent atoms comprise lithium.

15. The ceramic composite of claim 13, wherein the plurality of discrete ceramic components comprise a ceramic oxide.

16. The ceramic composite of claim 15, wherein the ceramic oxide comprises a material selected from titania, silica, alumina, zirconia, and combinations thereof.

17. The ceramic composite of claim 15, wherein the fluxing agent atoms comprise lithium atoms bonded to the ceramic oxide.

18. The ceramic composite of claim 15, wherein the plurality of discrete ceramic components are in the form of particles or fibers.

19. The ceramic composite of claim 13, wherein the bridging sites are formed without using a non-soluble fluxing agent.

20. The ceramic composite of claim 13, wherein the wet ceramic composition further comprises at least one non-soluble fluxing agent.

21. A method of strengthening a ceramic composite, the method comprising:
forming a wet ceramic composition comprising a plurality of discrete ceramic components and a fluxing agent dissolved in a solvent;
removing at least a portion of the solvent from the wet ceramic composition to form a dried ceramic composition comprising the plurality of discrete ceramic components coated with the fluxing agent; and
sintering the dried ceramic composition to form the ceramic composite, the sintering being carried out at a sinter temperature sufficient to fuse the discrete ceramic components at bridging sites formed where two or more of the discrete ceramic components coated with fluxing agent are in physical contact,
the ceramic composite having a first tensile strength that is greater than a second tensile strength of a second ceramic composite, if the second ceramic composite were to be made using a similar process with the same ingredients in the same amounts by weight as the ceramic composite having the first tensile strength, except that the fluxing agent of the second ceramic composite was non-soluble and remained in a solid form that was not dissolved in a solvent while making the second ceramic composite.

22. The method of claim 21, wherein the first tensile strength is increased by a range of 10% to 40% compared to the second tensile strength, where both the first tensile strength and the second tensile strength are measured by the ASTM D-1623-type B testing procedure using a test specimen in the through-the-thickness ("TTT") orientation.

23. The method of claim 4, wherein the fluxing agent is chosen from lithium metaborate, carbonates, borates, phosphates, silicates, and combinations thereof, and further wherein 80% to 100% by weight of the fluxing agent is dissolved in the solvent.

24. The method of claim 23, wherein the plurality of discrete ceramic components are fibers comprising a ceramic oxide.

25. The method of claim 24, wherein the fluxing agent is lithium metaborate.

26. The method of claim 25, wherein the wet ceramic composition further comprises at least one non-soluble fluxing agent in addition to the fluxing agent dissolved in the solvent, the non-soluble fluxing agent being a granular fluxing agent that does not appreciably dissolve in the solvent so that 80% to 100% by weight of the non-soluble fluxing agent remains in solid form in the wet ceramic composition prior to sintering.

27. The ceramic composite of claim 13, wherein the ceramic composite has a first tensile strength that is greater than a second tensile strength of the ceramic second composite, wherein the first tensile strength is increased by a range of 10% to 40% compared to the second tensile strength, where both the first tensile strength and the second tensile strength are measured by the ASTM D-1623-type B testing procedure using a test specimen in the through-the-thickness ("TTT") orientation.

* * * * *